July 5, 1932.  G. W. ELSEY  1,865,460

SHOCK ABSORBER

Filed March 11, 1931

Inventor

George W. Elsey

By Spencer, Hardman and Fehr

Attorneys

Patented July 5, 1932

1,865,460

UNITED STATES PATENT OFFICE

GEORGE W. ELSEY, OF DAYTON, OHIO, ASSIGNOR TO DELCO PRODUCTS CORPORATION, OF DAYTON, OHIO, A CORPORATION OF DELAWARE

SHOCK ABSORBER

Application filed March 11, 1931. Serial No. 521,695.

This invention relates to improvements in hydraulic shock absorbers, and particularly to the fluid flow control devices for such shock absorbers.

It is among the objects of the present invention to provide a hydraulic shock absorber of simple structure and design, having fluid flow control devices adapted to operate substantially noiselessly.

Another object of the present invention is to provide a hydraulic shock absorber with a unitary compound valve mechanism, adapted to control fluid flows within the shock absorber as the piston moves in either direction.

Further objects and advantages of the present invention will be apparent from the following description, reference being had to the accompanying drawing wherein a preferred embodiment of one form of the present invention is clearly shown.

Figure 1:
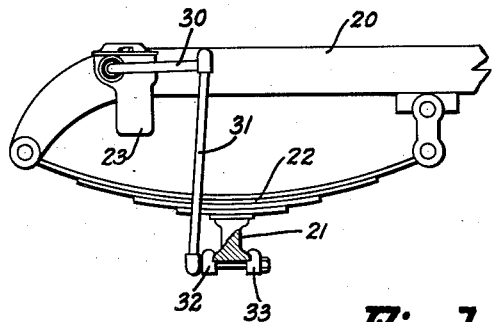
Fig. 1 is a fragmentary side view of a vehicle chassis having a shock absorber embodying the present invention applied thereto. The road wheels of the vehicle have been omitted for the sake of clearness.

Referring to the drawing, the numeral 20 designates the frame of the vehicle which is supported upon the axle 21 by springs 22.

The shock absorber comprises a casing 23 providing a fluid reservoir 24 and a cylinder 25. Within the cylinder there is provided a piston 26 having a head portion 27 adapted to be engaged by the rocker arm 28 which is supported by the rocker shaft 29 journalled in the casing 23. One end of the rocker shaft 29 extends outside the casing and has the shock absorber operating arm 30 secured thereto in any suitable manner. The free end of the operating arm 30 is swivelly attached to one end of a link 31, the opposite end of said link being secured to the axle 21 by clamping members 32 and 33.

The piston 26 forms a compression chamber 35 within the cylinder. A spring 36, interposed between the bottom end wall 37 of the cylinder and the head of the piston, yieldably urges said piston so that its head portion 27 is maintained in engagement with the end of the rocker arm 28.

In the piston head there is provided a passage 37 for the transfer of fluid between the compression chamber 35 and the reservoir 24. An annular valve seat 38 is provided on the inner surface of the piston head and surrounds the passage 37.

Figure 2:
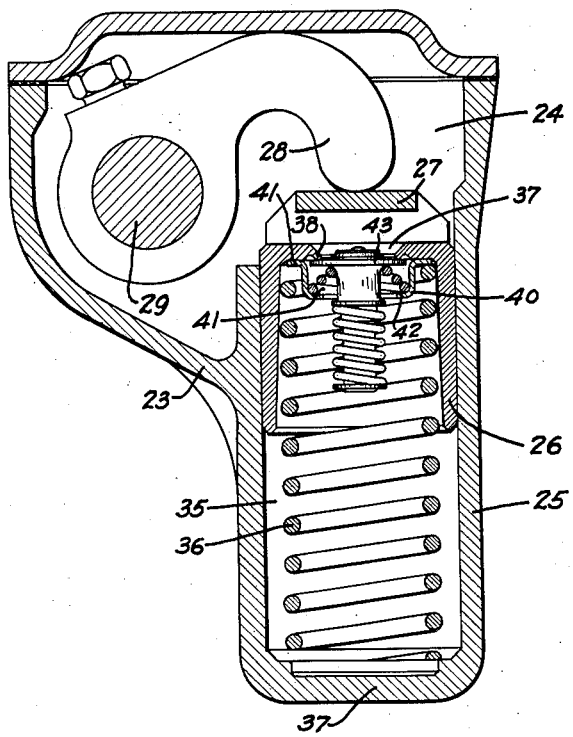
Fig. 2 is a vertical sectional view taken through the shock absorber, the valve mechanism being shown in elevation.

The fluid flow controlling device for the shock absorber comprises a valve-cage 40 having an inwardly extending flange 42 engaged by the spring 36, which urges said cage against the inner surface of the head of the piston 26. A spring 41 has its one end seated on an inwardly extending flange 42 on the valve-cage 40, the other end engaging the disc-valve 43, yieldably urging said disc-valve into engagement with the annular valve-seat 38 as shown in Fig. 2. This disc-valve has a central opening and a central tubular portion 44.

Figure 3:
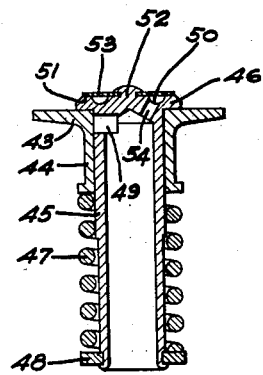
Fig. 3 is a longitudinal sectional view of the fluid flow control mechanism on an enlarged scale.

A tubular plunger-valve 45 is slidably supported within the tubular portion 44 of the disc-valve, the plunger-valve having a head portion 46 which is yieldably maintained against the upper surface of the disc-valve 43 by a spring 47 interposed between the disc-valve and an abutment washer 48 attached to one end of the tubular plunger-valve 45. Adjacent the head portion 46 a side opening 49 is provided in the tubular plunger-valve 45, this side opening 49 being normally closed by the tubular portion 44 of the disc-valve 43 inasmuch as said side opening lies within the confines of said disc-valve. An annular groove 50 is provided in the end surface of the head portion 46 of the plunger-valve 45. A comparatively narrow ridge 51 surrounds the annular groove 50 as shown in Fig. 3. Inside the annular groove 50 the head portion has a central extension 52 to which a resilient disc 53 is secured. Normally this resilient disc is seated upon the annular ridge 51. A duct or passage 54 in the head portion 46 of the valve 45 provides communication between the groove 50 and the interior of valve 45.

The shock absorber operates in the following manner:

When the road wheels, not shown, strike an obstruction in the roadway, the springs 22 will be flexed toward the frame 20, thereby causing the link 31 to operate the arm 30 in a counter-clockwise direction. Thus the rocker arm 28 will be moved in a similar direction thereby causing spring 36 to urge the piston 26 to follow the movement of arm 28 and thus fluid within the reservoir 24 acting through passage 37 will move the disc-valve 43 from engagement with the valve-seat 38 against the effect of spring 41 to establish a substantially free flow of fluid from the reservoir 24 into the compression chamber 35.

As the springs 22 move through their rebound stroke or, away from the frame 20, the link 31 will operate the arm 30 clockwise and thus arm 28 will push the piston 26 into the cylinder to exert pressure upon the fluid within the compression chamber 35. At a predetermined fluid pressure the resilient disc 53 will be flexed away from the annular ridge 51 and thus a fluid flow will be established from the compression chamber 35 through the tubular plunger-valve 45, its duct 54, into the groove 50 and thence through the annular space provided between the flexed disc 53 and the ridge 51. This fluid flow will be in the form of a disc-like sheet or spray, thereby substantially preventing hissing or whistling, a characteristic of a condensed stream. If the fluid pressure within the compression chamber 35 is excessive and not capable of being properly released by the fluid flow past the resilient disc 53, the valve 45 will be moved bodily relative to the valve 43 which supports it, and against the effect of spring 47, thereby moving the space 49 in said valve 45 outside the confines of the valve 43 and consequently there will be established a second pressure relieving flow from within the compression chamber 35 through valve 45 and its side passage 49. The fluid pressure being relieved at one side of the valve 45 will tend to overcome chattering of said valve 45 due to the unbalanced effect of the fluid pressure relief.

Figure 4:
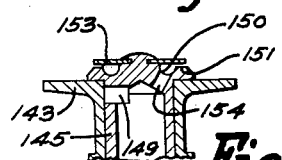
Fig. 4 is a fragmentary sectional view of a modified form of fluid flow control device.

In Fig. 4 a modified form of a fluid pressure release valve is shown. Here the disc valve 143 carries a similar plunger-valve 145 having side openings 149 normally covered by the disc valve 143. In this instance, however, the resilient disc 153 does not normally engage the annular ridge 151 surrounding the groove 150, but is maintained in spaced relation thereto whereby a flow of fluid from the compression chamber 35 is established as soon as pressure is exerted upon the fluid, this flow not being dependent upon the attainment of a predetermined pressure. The flow of fluid from the valve 145 through its passage 154 and groove 150 will be in the form of a disc-like sheet similar to that established by the valve of Fig. 3, however disc 153 in the present instance is substantially rigid and if the fluid flow through the space provided between it and the associate ridge 151 is not sufficient to relieve the fluid pressure, said disc 153 of Fig. 4 will not flex substantially, but the valve 145 will move to uncover its side port or passage 149.

In the present invention applicant has provided a simple fluid pressure control device capable of controlling the fluid flow in a shock absorber, the pressure relieving stream established by such a device being of such a character as to substantially eliminate whistling or hissing noises.

While the form of embodiment of the present invention as herein disclosed, constitutes a preferred form, it is to be understood that other forms might be adopted, all coming within the scope of the claims which follow.

What is claimed is as follows:

1. In a shock absorber, the combination with a casing providing a cylinder; of a piston in said cylinder, said piston having a passage for the transfer of fluid therethrough; a valve yieldably urged to close said passage; a plunger valve slidably carried by said first mentioned valve and operable by fluid pressure to establish a restricted flow of fluid through said valve; an orifice in said plunger valve; and a resilient disc normally closing said orifice but operable by fluid pressure initially to establish a restricted flow of fluid through said valve.

2. In a shock absorber, the combination with a casing providing a cylinder; of a piston in said cylinder, said piston having a passage for the transfer of fluid therethrough; a disc valve yieldably urged to close the piston passage, said disc valve having a central opening and a cylindrical extension; a tubular plunger valve slidably carried in said disc valve, said plunger valve having a side opening normally closed by the disc valve; an annular groove in the outer end surface of said plunger valve; a seat surrounding said groove; a resilient disc attached centrally of the plunger valve and normally engaging the seat; and a fluid passage providing communication between the groove and the interior of the tubular plunger valve.

3. In a shock absorber, the combination with a casing providing a cylinder; of a piston in said cylinder, said piston having a passage for the transfer of fluid therethrough; a disc valve yieldably urged to close the piston passage, said disc valve having a central opening and a cylindrical extension; a tubular plunger valve slidably carried in said disc valve, said plunger valve having a side opening normally closed by the disc valve; an annular groove in the outer end surface of said plunger valve; a seat surrounding said groove; a resilient disc attached centrally of the plunger valve and normally spaced from said seat, forming an annular orifice; and a fluid passage providing communication between the annular groove and the interior of the tubular valve.

4. In a shock absorber, the combination with a casing providing a cylinder; of a piston in said cylinder, said piston having a passage for the transfer of fluid therethrough; a compound fluid flow controlling device for the piston passage, said device comprising a disc valve yieldably urged into engagement with the piston and adapted to establish a substantially free flow of fluid through said passage in response to the movement of the piston in one direction, a plunger valve slidably supported by the disc valve and having a side opening normally closed by said disc valve, said plunger valve being movable relative to said disc valve to establish a restricted flow of fluid through said valve in response to a predetermined fluid pressure as the piston moves in the opposite direction; an orifice in said plunger valve, and a resilient disc normally closing said orifice but operable at a pressure of lesser degree than said aforementioned predetermined fluid pressure to establish a restricted flow of fluid through said valve as the piston moves in said opposite direction.

5. In a shock absorber, the combination with a casing providing a cylinder; of a piston in said cylinder, said piston having a passage for the transfer of fluid from one side of the piston to the other; a valve mechanism adapted to control the flow of fluid through said piston passage in both directions, said valve mechanism comprising a disc valve adapted to establish a flow of fluid through the piston passage in one direction only, said disc valve slidably supporting a tubular valve having a head portion normally resting upon the disc valve, a side opening normally confined within the disc valve, an annular groove in the outer surface of said head portion in communication with the interior of the tubular valve through a channel in the head portion, and a thin, metallic disc centrally rigidly attached to the tubular valve head and restricting the flow of fluid from the annular groove therein.

6. In a shock absorber, the combination with a casing providing a cylinder; of a piston in said cylinder, said piston having a passage for the transfer of fluid from one side of the piston to the other; a valve mechanism adapted to control the flow of liquid through said piston passage in both directions, said valve mechanism comprising a disc valve adapted to establish a flow of fluid through the piston passage in one direction only, said disc valve slidably supporting a tubular valve having a head portion normally resting upon the disc valve, a side opening normally confined within the disc valve, an annular groove in the outer surface of said head portion in communication with the interior of the tubular valve through a channel in the head portion, and a thin, metallic disc centrally rigidly attached to the tubular valve head and restricting the flow of fluid from the annular groove in the said head whereby said fluid flowing through the channel in said head will fill the entire annular groove and emerge between the disc and head in a sheet-like spray.

In testimony whereof I hereto affix my signature.

GEORGE W. ELSEY.